United States Patent [19]

Denniston

[11] 4,327,784
[45] May 4, 1982

[54] APPARATUS FOR REFUELING AN AIRCRAFT FROM A SHIP AT SEA

[75] Inventor: James L. Denniston, Columbus, Ohio

[73] Assignee: Rockwell International Corporation, El Segundo, Calif.

[21] Appl. No.: 157,697

[22] Filed: Jun. 9, 1980

[51] Int. Cl.³ .............................................. B65B 3/04
[52] U.S. Cl. .................................... 141/387; 114/261; 137/615; 212/146; 222/23; 244/135 A; 414/138
[58] Field of Search ................ 137/615, 236 R, 236 S; 141/279, 387, 388, 389, 1, 94, 284; 114/261; 244/135 A, 115, 116, 137 R; 414/138; 212/146, 147; 222/23-52

[56] References Cited

U.S. PATENT DOCUMENTS 3,799,358  3/1974  Putnam ........................... 244/137 R Primary Examiner—Houston S. Bell, Jr.
Attorney, Agent, or Firm—Charles T. Silberberg

[57] ABSTRACT

An apparatus is disclosed for refueling an aircraft primarily fron a ship at sea, the ship being subject to changes in vertical and horizontal position due to pitch, roll, and heave, and combinations thereof. The apparatus comprises a first beam having a first end pivotally attached to the ship and extending upward therefrom. A second beam is pivotally attached at its first end to the second end of the first beam and extends substantially in a horizontal direction therefrom and preferably is supported by an air spring mounted between the first and second beams. A positioning device, preferably in the form of a hydraulic actuating cylinder, is coupled to both the first beam and the ship and is adapted to adjust the angular position of the first beam with respect to the ship in response to a first control signal. A propulsion system, preferably in the form of a duct fan having a variable pitch or variable speed, is mounted on the second beam and is adapted to provide a variable propulsive force to adjust the angular position of the second beam with respect to the first beam in response to a second control signal. A fuel delivery system is provided having an outlet mounted on the second beam at the second end adapted to deliver fuel to the aircraft. A control system is provided which is coupled to and adapted to provide the first and second control signals to the hydraulic cylinder and the ducted fan, respectively, so as to adjust the angular positons of the first and second beams such that the outlet of the fuel delivery system remains at a substantially constant position as the ship changes position.

8 Claims, 5 Drawing Figures

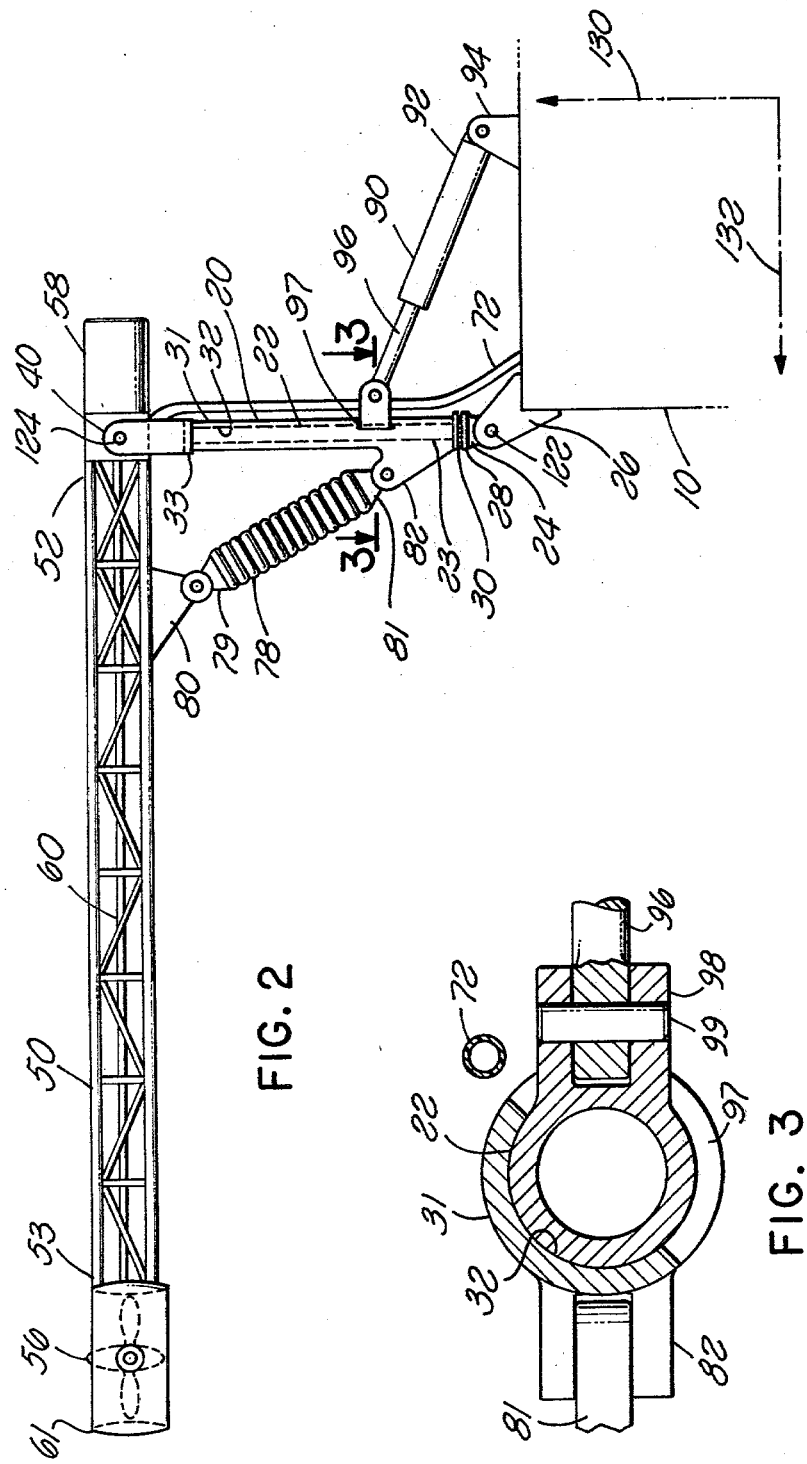

APPARATUS FOR REFUELING AN AIRCRAFT FROM A SHIP AT SEA

BACKGROUND OF THE INVENTION

1. Field of the Invention

The invention relates to the field of fluid transfer apparatus for refueling an aircraft, and particularly to an apparatus for refueling vertical and/or short take off and landing aircraft from a ship.

2. Description of Prior Art:

Because vertical and/or short take off and landing aircraft (V/STOL) can hover or travel at extremely small horizontal speeds, it is possible to refuel such aircraft from ships at sea. The problem has been how to connect the ship to the aircraft and yet accommodate the relatively large displacements or position changes of the ship due to heave, roll, and pitch, or combinations thereof. Conventional ship-to-ship or ship-to-shore type fuel transferring apparatus, such as disclosed in U.S. Pat. Nos. 3,805,834, Double Counterbalance Marine Loading Arm by P. J. Bily; 3,889,728, Marine Loading Arm For Bunkering Vessels by R. M. Riche; 4,109,688, Attitude Maintaining Mechanism For A Marine Loading Arm by N. E. Jameson; and 4,142,551, Hydraulically Balanced Marine Loading Arm by C. A. Wilms are not particularly suitable for coupling to an aircraft. Even though these refueling booms are typically counterbalanced and incorporate swivel joints in both the vertical and horizontal planes, inertia and friction loads would still be coupled to the aircraft as the ship changed position. This would make control of the aircraft difficult, especially when in the hovering mode.

Aircraft to aircraft type refueling systems, such as disclosed in U.S. Pat. No. 4,072,283, Aerial Refueling Boom Articulation by R. H. Weiland, are also unsuitable. Refueling of conventional aircraft in flight is accomplished by use of tanker aircraft such as the United States Air Force KC-135. The aircraft to be refueled is brought into close proximity to the rear of the tanker and velocities are matched. A refueling boom is then extended and lowered, typically controlled by an operator in the tail of the tanker. The pilot of the aircraft to be refueled and the boom operator maneuver the aircraft and boom, respectively, to accomplish coupling. The boom, typically, incorporates ruddervators mounted at the end of the boom which provide both vertical and horizontal position control. Unfortunately, the use of aerodynamic control surfaces for positioning a refueling boom on board a ship would not be effective because of the ship's slow speed, unless they were made extremely large.

Also of interest in U.S. Pat. No. 1,869,487, Fuel Supplying Apparatus For Aircraft, by L. Lefevre, et al. Lefvevre, et al. disclose a horizontal refueling boom rotatably mounted to a tower. The boom is rotated and the aircraft flies in a circle at the same rotational velocity. Thereafter, the crew couples a hose to a fuel inlet on the aircraft. Here the problem is that there is no means to compensate for the ship's position and a rotating boom is not required for a V/STOL aircraft because of their ability to hover.

Therefore, it is a primary object of this invention to provide an apparatus for refueling a V/STOL aircraft from a ship at sea.

A further object of this invention is to provide a refueling apparatus for refueling a V/STOL aircraft from a ship at sea that minimizes loads induced into the aircraft by movement of the ship.

A still further object of this invention is to provide a refueling apparatus which maintains the point of connection to the V/STOL aircraft in a substantially constant position eliminating the effects of ship changes due to heave, roll, and pitch, or combinations thereof.

SUMMARY OF THE INVENTION

The invention is an apparatus for refueling an aircraft from a ship at sea, the ship being subject to changes in vertical and horizontal position due to pitch, roll, and heave, and combinations thereof. The apparatus comprises a first beam having a first end pivotally attached to the ship extending upward therefrom. A second beam is pivotally attached at its first end to the second end of the first beam extending substantially in a horizontal direction therefrom and preferably supported by an air spring mounted between the first and second beams. A positioning means (preferably in the form of a hydraulic actuating cylinder) is coupled to both the first beam and the ship and is adapted to adjust the angular position of the first beam with respect to the ship in response to a first control signal. A propulsion means, preferably in the form of a ducted fan, having a variable pitch or variable speed, or both, is mounted to the second end of the second beam and is adapted to provide a variable propulsive force to adjust the angular position of the second beam with respect to the first beam in response to a second control signal.

A fuel delivery means is provided having an outlet mounted on the second end of the second beam, adapted to deliver fuel to the aircraft. A control means is provided which is coupled to and adapted to provide the first and second control signals to the hydraulic cylinder and the ducted fan, respectively, so as to adjust the angular positions of the first and second beams such that the outlet of the fuel delivery system remains at a substantially constant position as the ship changes position. The control means, preferably, comprises first and second accelerators mounted on the first beam in proximity to the outlet of the fuel delivery means, which are adapted to sense horizontal and vertical acceleration, respectively, of the outlet and to provide output signals proportional thereto. A first position indicator is coupled to and adapted to sense the angular relationship between the first and second beam and provide an output signal proportional thereto. A second position indicator is coupled to and adapted to sense the angular relationship between the first beam and the ship and provide an output signal proportional thereto. A controller adapted to use the output signal from the first and second accelerators and the first and second position indicators provides the first and second control signals.

The novel features which are believed to be characteristic of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only, and are not intended as a definition of the limits of the invention.

DESCRIPTION OF THE DRAWINGS

FIG. 2 illustrates a side elevation view of the refueling apparatus.

FIG. 3 is a cross-sectional view through the first beam of the refueling apparatus along the lines 3—3.

DESCRIPTION OF PREFERRED EMBODIMENT

Figure 1:
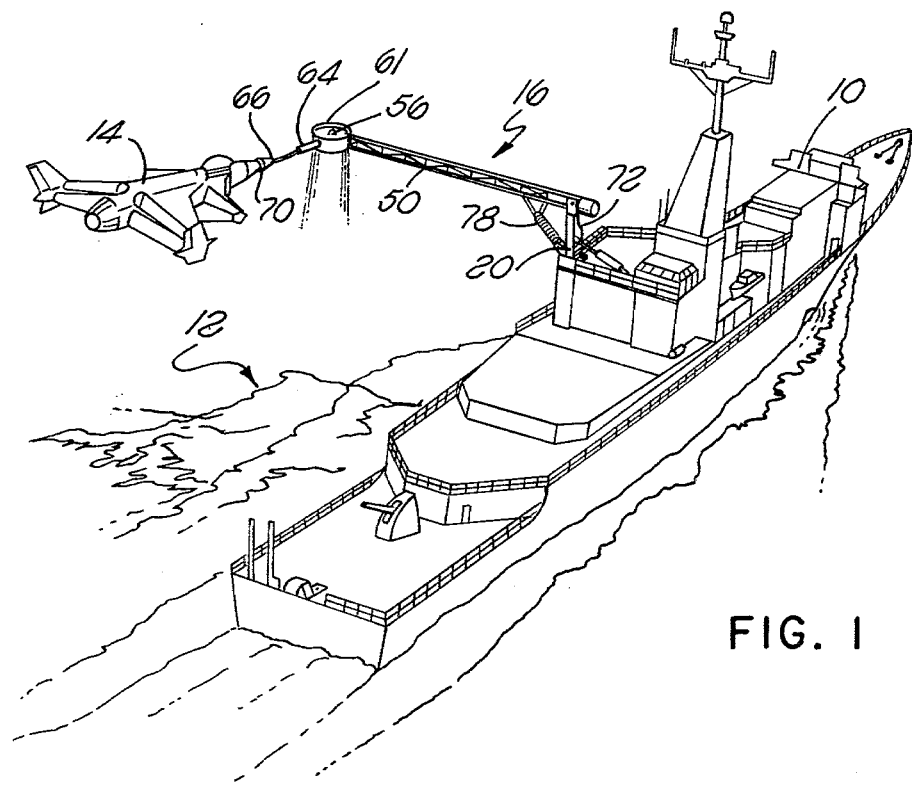
FIG. 1 is a perspective view of a ship refueling an aircraft by means of the subject refueling apparatus.

Illustrated in FIG. 1 is a perspective view of a ship 10 shown traveling at sea (designated by numeral 12) in the process of refueling a vertical and/or short take off and landing aircraft (V/STOL) designated by numeral 14 by means of a refueling apparatus 16. The apparatus 16 is mounted on the side of the ship 10 and extends horizontally outward therefrom so that there is little possibility of the aircraft 14 coming into contact with the superstructure of the ship.

Illustrated in FIG. 2 is a side elevation view of the refueling apparatus 16 shown in FIG. 1, while illustrated in FIG. 3 is a cross-sectional view of beam 20 along the lines 3—3. Still refering to FIG. 1 and additionally to FIGS. 2 and 3 it can be seen that the apparatus 16 comprises a first beam 20 which projects in an upward direction from said ship. The beam 20 comprises a shaft 22 which at its first end 23 has a fitting 24 pivotally coupled to a clevis 26 mounted to the superstructure of the ship 10 by means of a pin (not shown). The fitting 22 incorporates a shoulder 28 upon which is mounted a thrust bearing 30. A member 31 is provided which has a bore 32 engaging the shaft 22 and an end 34 which rests on bearing 30, thus allowing member 31 to rotate about shaft 22. The second end 33 of the member 31 terminates in a clevis 40. A second beam 50 is mounted at its first end 52 in clevis 40 by means of a pin (not shown).

The second end 53 of the second beam 50 terminates in a propulsion means, preferably in the form of a ducted fan 56. A motor 58, mounted on the end 52 of the beam 50, drives the ducted fan 56 by means of drive shaft 60 rotatably mounted in the beam 50. The ducted fan is, preferably, a variable pitch type so that the propulsive force produced thereby can be varied or, alternately, the motor 58 can be made a variable speed type or a combination of the two may be used. A fan is preferred because of its relatively high efficiency, but it must be understood a throttlable high pressure gas ejector system, or the like, could also be used. The duct portion 61 of the ducted fan 56 incorporates a fuel outlet 64 which terminates in a droge 66 adapted to mate with a refueling probe 70 on the aircraft 14. Fuel is supplied from the ship's tanks (not shown) via a flexible line 72 which couples to a pipe (not shown) mounted within the second beam 50 which connects to the outlet 64.

A biasing means, preferably in the form of an air spring 78, is pivotally coupled at its first end 79 to a bracket 80 attached to the second beam 50 and at its second end 81 to a bracket 82 mounted to the member 31 of beam 20. The air spring 78 maintains the beam 50 at approximately 90° to beam 20, thus under calm sea conditions beam 20 is substanually perpendicular to the surface of the sea and beam 50 is substanually parallel to the surface of the sea. The air spring 78 serves additional functions which will be subsequently discussed.

A positioning means, preferably in the form of a hydraulic cylinder 90, is attached by its cylinder portion 92 to a fitting 94 rigidly attached to the superstructure of the ship 10. The rod portion 96 of the cylinder 90 extends through a notch 97 in the member 31 and is pivotally attached to a clevis 98, rigidly attached to the shaft 22, by means of pin 99. Incorporating the notch 97 in the member 31 and attaching the rod portion 96 of cylinder 90 to shaft 22 allows the second beam 50 to be rotated to a position parallel with the keel of the ship for storage purposes and extended for refueling of an aircraft by an actuator (not shown).

Figure 4:
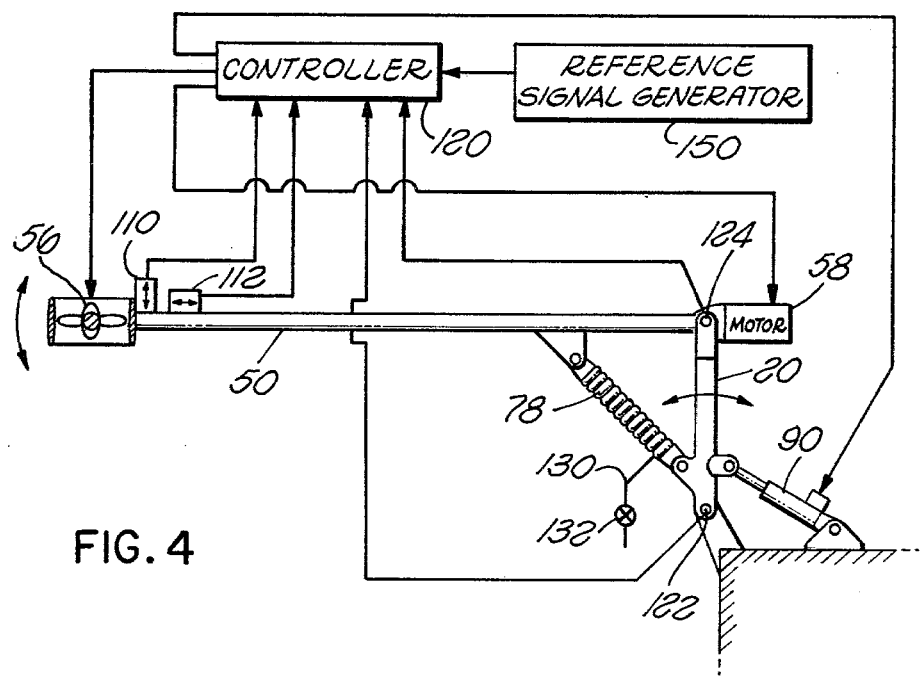
FIG. 4 is a schematic representation of the control system for the refueling apparatus.

Illustrated in FIG. 4 is a schematic of the control means or system for the apparatus 16. Still referring to FIGS. 1-3, and additionally to FIG. 4, it can be seen that a pair of accelerometers 110 and 112 are mounted on the beam 50 in proximity to the outlet 64. Accelerometers 110 and 112 are adapted to measure vertical and horizontal accelerations, respectively, of the outlet 64 and provide output signals proportional thereto, to a controller 120. A first sensor 122 is mounted on the end 23 of the first beam 20 and is adapted to measure the angular relationship between the vertical axis 123 of the ship 10 at rest and the first beam 20. A second sensor 124 is mounted on the second end 33 of the beam 20 and is adapted to measure the angular relationship between the beams 20 and 50. Both of these angular position measuring devices 122 and 124 provides output signals which are coupled to the controller 120. The controller 120 need only be a state-of-the-art combination computer and amplifier system capable of analysing the output signal from the accelerometers 110 and 112 and angular position devices 122 and 124 and provide the first and second control signals.

In operation, the air spring 78 is pressurized through line 130 coupled to a pressurized air supply (not shown) having sufficient pressure so as to position the beam 50 substantially horizontal (parallel to the surface of a calm sea). A valve 132 is mounted in line 130 to control the pressure level within air spring 78. Thus, substantially all the weight of the droge 64, ducted fan 56, beam 50 and associated equipment mounted thereon are coupled to and absorbed by beam 20. The mass of the beam 50 and the spring constant of the air spring are tuned to provide a beam natural frequency well below the ship frequencies encountered over a wide range of sea conditions. This separation of natural frequencies in effect decouples the beam from the ships motions and greatly reduces the control power requirements. This condition together with proper selection of the beam 50 center of gravity provides a fail-safe feature in that even with an inoperative ducted fan little of the ships motions will be reflected at the droge 64.

The controller 120 is provided with a reference signal from the reference signal generator 150 which is proportional to the ideal location of both the first beam 20 and second beam 50. Should the ship 10 roll, pitch, or heave, or any combinations thereof, the controller 120, using a signal from the accelerometers 110 and 112 and position indicators 122 or 124, provides an output signal to the fan to vary its propulsive force so as to hold the outlet 64 in a substantially fixed vertical position. The controller 120 can also be used to provide an output signal to the motor 58 to vary the speed of the ducted fan 56 in order to vary the propulsive force. The controller 120 also provides an output signal to the hydraulic cylinder 90 in order to control the position of the first beam 20. Thus, regardless of the change in position of the ship, the ducted fan 56 and hydraulic cylinder 90 will readjust the angular relationship between the first and second beams 20 and 50, respectively, and the angular relationship between the beam 20 and the vertical axis indicated by arrow 130 of the ship at rest in a calm sea.

Figure 5:
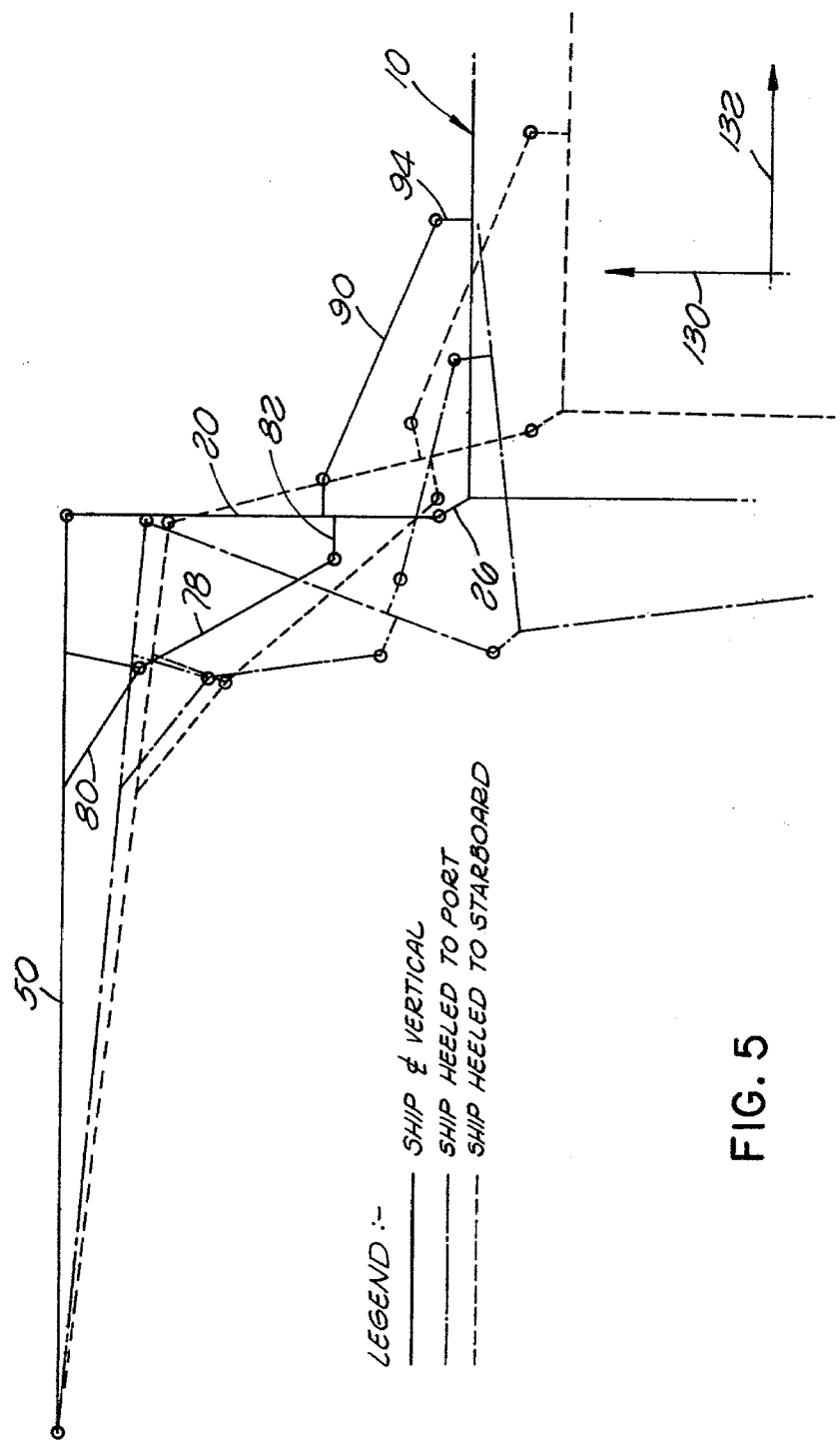
FIG. 5 is a schematic representation of the refueling apparatus shown accommodating various changes in ship position.

Illustrated in FIG. 5 is an idealized representation of the refueling apparatus 16 shown in three positions caused by ship's 10 change in position. Shown in solid lines is an ideal position wherein there is no heave, pitch or roll (in a calm sea). Shown in dotted lines is the position of the apparatus 16 when the ship has either heaved or pitched upward and rolled to the left (heeled to port); while illustrated in dashed lines is the position of the apparatus 16 when the ship has rolled to the right and dropped deeper into the sea (heeled to starboard). In either case, the second end 53 of the second beam 50 can be maintained substantially stationary, thereby minimizing the amount of maneuvering required by the pilot of the aircraft to maintain the fuel probe 70 in contact with the drog 66.

Finally, while the refueling apparatus has been described with reference to a particular embodiment, it should be understood that such an embodiment is merely illustrative as there are numerous variations and modifications which may be made by those skilled in the art. Thus, the invention is to be construed as being limited only by the spirit and scope of the appended claims.

Therefore, what is claimed is:

1. An apparatus for refueling an aircraft from a ship at sea, said ship subject to changes in vertical and horizontal position due to pitch, roll, and heave, comprising:
   a first beam having first and second ends, said first end pivotally attached to said ship;
   a second beam having first and second ends, said first end pivotally attached to said second end of said first beam;
   positioning means coupled to both said first beam and said ship adapted to adjust the angular position of said first beam with respect to said ship in response to a first control signal;
   propulsion means mounted to said second beam adapted to provide a variable propulsive force to adjust the angular position of said second beam with respect to said first beam in response to a second control signal;
   fuel delivery means, having an outlet adapted to deliver fuel to said aircraft, mounted on said second beam; and
   control means coupled to and adapted to provide said first and second control signals to control said positioning means and said propulsion means, respectively, so as to adjust said angular positions of said first and second beams such that said outlet of said fuel delivery means remains at a substantially constant position as said ship changes position.

2. The apparatus of claim 1 wherein said first and second beams are rotated to compansate for changes in horizontal and vertical positions of said ship.

3. The apparatus of claim 2 further including biasing means coupled to said first and second beams adapted to transfer a substantial portion of said load from said first beam to said second beam.

4. The apparatus of claim 3 wherein said biasing means comprises an airspring.

5. The apparatus of claim 3 wherein said propulsion means comprises a ducted fan and said positioning means comprises a hydraulic cylinder.

6. The apparatus of claim 5 wherein said control means comprises:
   first and second accelerometers mounted on said first beam in proximity to said outlet of said fuel delivery means adapted to sense horizontal and vertical acceleration, respectively, of said outlet and to provide output signals proportional thereto;
   a first position indicator adapted to sense the angular relationship between said first and second beam and provide an output signal proportional thereto;
   a second position indicator adapted to sense the angular relationship between said first beam and said ship and provide an output signal proportional thereto;
   a controller adapted to use said output signals from said first and second accelerometers and said first and second position indicators to provide said first and second control signals.

7. The apparatus of claim 6 wherein said fan has a variable speed.

8. The apparatus of claim 5, or 6, or 7, wherein said fan has a variable pitch.

* * * * *